US008340845B2

(12) United States Patent
Bamba

(10) Patent No.: US 8,340,845 B2
(45) Date of Patent: Dec. 25, 2012

(54) MARINE VESSEL THEFT DETERRENT APPARATUS AND MARINE VESSEL INCLUDING THE SAME

(75) Inventor: Takaaki Bamba, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 434 days.

(21) Appl. No.: 12/538,886

(22) Filed: Aug. 11, 2009

(65) Prior Publication Data

US 2010/0049385 A1 Feb. 25, 2010

(30) Foreign Application Priority Data

Aug. 22, 2008 (JP) ................................ 2008-214380

(51) Int. Cl.
*B60L 3/00* (2006.01)

(52) U.S. Cl. ........................................................ 701/21

(58) Field of Classification Search ........................ None
See application file for complete search history.

(56) References Cited

U.S. PATENT DOCUMENTS

| | | | | |
|---|---|---|---|---|
| 6,265,966 | B1 * | 7/2001 | Ireland et al. | 340/426.14 |
| 6,758,703 | B2 * | 7/2004 | Funayose et al. | 440/1 |
| 6,894,599 | B2 * | 5/2005 | Funayose et al. | 340/5.54 |
| 7,679,486 | B2 * | 3/2010 | Okada | 340/5.72 |
| 2005/0192735 | A1 | 9/2005 | Ito et al. | |
| 2007/0198167 | A1 * | 8/2007 | Dery | 701/113 |

FOREIGN PATENT DOCUMENTS

| | | | |
|---|---|---|---|
| JP | 08-135495 | A | 5/1996 |
| JP | 2001-146148 | A | 5/2001 |
| JP | 2005-248710 | A | 9/2005 |
| JP | 2006-266097 | A | 10/2006 |

OTHER PUBLICATIONS

Bamba; "Marine Vessel Theft Deterrent Apparatus and Marine Vessel Including the Same"; U.S. Appl. No. 12/538,887, filed Aug. 11, 2009.
Bamba; "Marine Vessel Theft Deterrent Apparatus and Marine Vessel Including the Same"; U.S. Appl. No. 12/538,888, filed Aug. 11, 2009.

* cited by examiner

*Primary Examiner* — Thomas Tarcza
*Assistant Examiner* — Nagi Murshed
(74) *Attorney, Agent, or Firm* — Keating & Bennett, LLP

(57) ABSTRACT

A theft deterrent apparatus in a marine vessel including a propulsion device having an engine coupled to a starter and a power generator, includes an authentication unit arranged to operate by receiving power from a battery that is arranged to supply power to the starter and accumulate power generated by the power generator, an operation control unit arranged to allow operation of the propulsion device if authentication by the authentication unit does succeed and prohibit operation of the propulsion device if authentication by the authentication unit does not succeed, a fault detection unit arranged to detect a fault of the authentication unit, and a fault detection control unit arranged to make a provisional fault judgment when the fault detection unit detects the fault of the authentication unit before completion of engine starting by the starter, and then make the fault detection unit perform the fault detection again after the completion of engine starting by the starter.

14 Claims, 7 Drawing Sheets

MARINE VESSEL THEFT DETERRENT APPARATUS AND MARINE VESSEL INCLUDING THE SAME

BACKGROUND OF THE INVENTION

1. Field of the Invention

The present invention relates to a theft deterrent apparatus for a marine vessel which includes a propulsion device, and to a marine vessel that includes the theft deterrent apparatus.

2. Description of Related Art

An immobilizer is an example of an anti-theft apparatus for an automobile. The immobilizer collates an ID code, which is transmitted from a transponder incorporated in a key, with an ID code registered at the vehicle side. When these ID codes match, the immobilizer allows starting of an engine. The engine thus cannot be started unless a genuine key is used.

It has been proposed to apply such an immobilizer to a marine vessel to prevent the theft thereof (see, for example, Japanese Unexamined Patent Application Publication No. 2001-146148).

SUMMARY OF THE INVENTION

The inventor of preferred embodiments of the invention described and claimed in the present application conducted an extensive study and research regarding a marine vessel theft deterrent apparatus, and in doing so, discovered and first recognized new unique challenges and problems as described in greater detail below.

When a fault occurs in an immobilizer or other authentication unit installed in a marine vessel, it is preferable that this fault be detected and inspection or repair be performed immediately.

Meanwhile, a power supply cable for supplying power from a battery to a propulsion device and the authentication unit is drawn inside the marine vessel and a total length of the cable may exceed 10 meters. In such a case, a voltage drop that occurs in the power supply cable when a starter is actuated to start an engine cannot be neglected. There is a possibility for the authentication unit to stop operating temporarily due to being influenced by the voltage drop. This may lead to a misjudgment that a fault is occurring in the authentication unit.

In order to overcome the previously unrecognized and unsolved problem mentioned above, a preferred embodiment of the present invention provides a theft deterrent apparatus for a marine vessel. The marine vessel which includes a propulsion device having, as a drive source, an engine coupled to a starter and a power generator. The theft deterrent apparatus for marine vessel includes an authentication unit, an operation control unit, a fault detection unit, and a fault detection control unit. The authentication unit is arranged to operate by receiving power from a battery. The battery is arranged to supply power to the starter and accumulate power generated by the power generator. The operation control unit is arranged to allow operation of the propulsion device if authentication by the authentication unit does succeed and prohibit operation of the propulsion device if authentication by the authentication unit does not succeed. The fault detection unit is arranged to detect a fault of the authentication unit. The fault detection control unit is arranged to make a provisional fault judgment when the fault detection unit detects the fault of the authentication unit before completion of engine starting by the starter, and then make the fault detection unit perform the fault detection again after the completion of engine starting by the starter.

With this configuration, the operation of the propulsion device is enabled if the authentication by the authentication unit succeeds, and the operation of the propulsion device is prohibited if the authentication by the authentication unit fails. A theft deterrent effect is thereby attained.

When the fault detection unit detects a fault of the authentication unit before the engine is started (before the operation is started), a provisional fault judgment is made. The fault detection is then performed again after the completion of engine starting. After the completion of engine starting, the starter is stopped, power generation by the power generator is started, and the voltage supplied to the authentication unit thus recovers. Thus, if the fault of the authentication unit is detected in this state, it can be determined that a problem is occurring in the authentication unit. If the fault of the authentication unit is no longer detected after the completion of engine starting, it can be determined that the fault detected before the completion of engine starting has been caused by a temporary voltage drop during the starting process.

That is, when the fault of the authentication unit is detected before the completion of engine starting, the provisional fault judgment is made, and if the fault of the authentication unit is detected even after the completion of engine starting, a main fault judgment is made. If the fault of the authentication unit is no longer detected after the completion of engine starting, the provisional fault judgment is cancelled.

In a preferred embodiment, the operation control unit is arranged to set an operation mode of the propulsion device to an ordinary operation mode if authentication by the authentication unit does succeed, prohibit operation of the propulsion device if the authentication by the authentication unit does not succeed, and, when the fault detection unit detects the fault of the authentication unit, set the operation mode of the propulsion device to an emergency operation mode in which a predetermined restriction is applied as compared to the ordinary operation mode.

With this configuration, if the authentication by the authentication unit succeeds, the propulsion device can be operated in the ordinary operation mode, and if the authentication fails, the operation of the propulsion device is prohibited. A theft deterrent effect is thereby obtained. Further, when a fault of the authentication unit occurs, the propulsion device can be operated in the emergency operation mode. Thus, even if the fault occurs offshore, return to port or shore is enabled because the propulsion device can be operated in the emergency operation mode to apply a propulsive force to the marine vessel. The emergency operation mode is an operation mode in which a restriction is applied with respect to the ordinary operation mode.

A thief intending to steal the marine vessel or the propulsion device may try to achieve his/her purpose by putting the authentication unit in a non-operating state (that is, a fault state). However, when the authentication unit is in the fault state, only operation in the emergency operation mode is allowed. The marine vessel or the propulsion device is thus made low in economic value and it becomes difficult to obtain a profit by reselling. There is thus no merit for theft and consequently, a theft deterrent effect is attained.

The emergency operation mode may, for example, be a mode enabling operation of the propulsion device in a range not exceeding an upper limit output that is lower than a maximum output allowed in the ordinary operation mode. For example, the propulsion device may have an engine as a power source. In this case, an engine speed in the emergency operation mode may be restricted within a range not exceeding an upper limit engine speed that is lower than a maximum engine speed in the ordinary operation mode.

In a preferred embodiment, the fault detection control unit is arranged to make the provisional fault judgment when the fault detection unit detects the fault of the authentication unit before the completion of engine starting, make the main fault judgment when the fault detection unit detects the fault of the authentication unit after the completion of engine starting, and cancel the provisional fault judgment when the fault detection unit does not detect the fault of the authentication unit after the completion of engine starting. Preferably in this case, if the fault detection unit does not detect the fault of the authentication unit, the operation control unit may set the operation mode of the propulsion device to the ordinary operation mode if authentication by the authentication unit does succeed and prohibit operation of the propulsion device if the authentication by the authentication unit does not succeed. If the provisional fault judgment is made, the operation control unit may preferably allow starting of the propulsion device and set the operation mode of the propulsion device to the emergency operation mode. If the provisional fault judgment is cancelled after the completion of starting of the propulsion device, the operation control unit may preferably control the propulsion device in accordance with the authentication result of the authentication unit.

With this configuration, if the provisional fault judgment is made, the starting of the propulsion device is allowed and the operation mode is set to the emergency operation mode. If the fault is detected even after the completion of starting of the propulsion device, the propulsion device is operated in the emergency operation mode. If the fault is no longer detected after the completion of starting of the propulsion device and the provisional fault judgment is cancelled, the propulsion device is controlled according to the authentication result of the authentication unit. That is, if the authentication succeeds, the propulsion device can be operated in the ordinary operation mode. If the authentication fails, the operation of the propulsion device is prohibited. That is the engine, with which starting has been completed once, is stopped.

Preferably, the operation control unit does not change the operation mode while the engine is in operation. More specifically, it is preferable that a change to the emergency operation mode is not performed while the engine is operating in the ordinary operation mode. Also in the case where the operation mode is set to the emergency operation mode, it is preferable that after the main fault judgment has been made, the operation mode is maintained in the emergency operation mode while the engine is in operation. An uncomfortable feeling felt by a crew member or passenger due to changing of the operation mode can thereby be prevented.

In a preferred embodiment, the authentication unit includes a signal transmission unit is arranged to transmit a signal at a predetermined period or cycle to the fault detection unit, and the fault detection unit is arranged to judge that a fault has occurred in the authentication unit when the signal from the signal transmission unit is interrupted for a predetermined time that is longer than the predetermined period.

With this configuration, when the signal (periodic data, for example) that is sent periodically from the authentication unit is interrupted for not less than the predetermined time, it is judged that a fault has occurred. Whether or not a fault has occurred can thus be judged by a simple configuration.

The fault detection unit may be configured in other ways. For example, a power supply voltage of the authentication unit may be monitored and it can be judged that a fault has occurred when an anomaly of the voltage is detected. Or, the authentication unit may include a pair of computers that execute the same processes and thereby be configured as a duplex system. In this case, the fault detection unit may monitor the operations of the pair of computers and judge that a fault has occurred when a mismatch of operations is detected.

A preferred embodiment of the present invention provides a marine vessel that includes a hull, a propulsion device installed on the hull, and the marine vessel theft deterrent apparatus having the above-described characteristics.

With this configuration, theft of the marine vessel can be deterred. Misjudgment of a fault due to a temporary voltage drop during engine starting can also be prevented. A marine vessel including a theft deterrent apparatus of high reliability can thus be provided.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
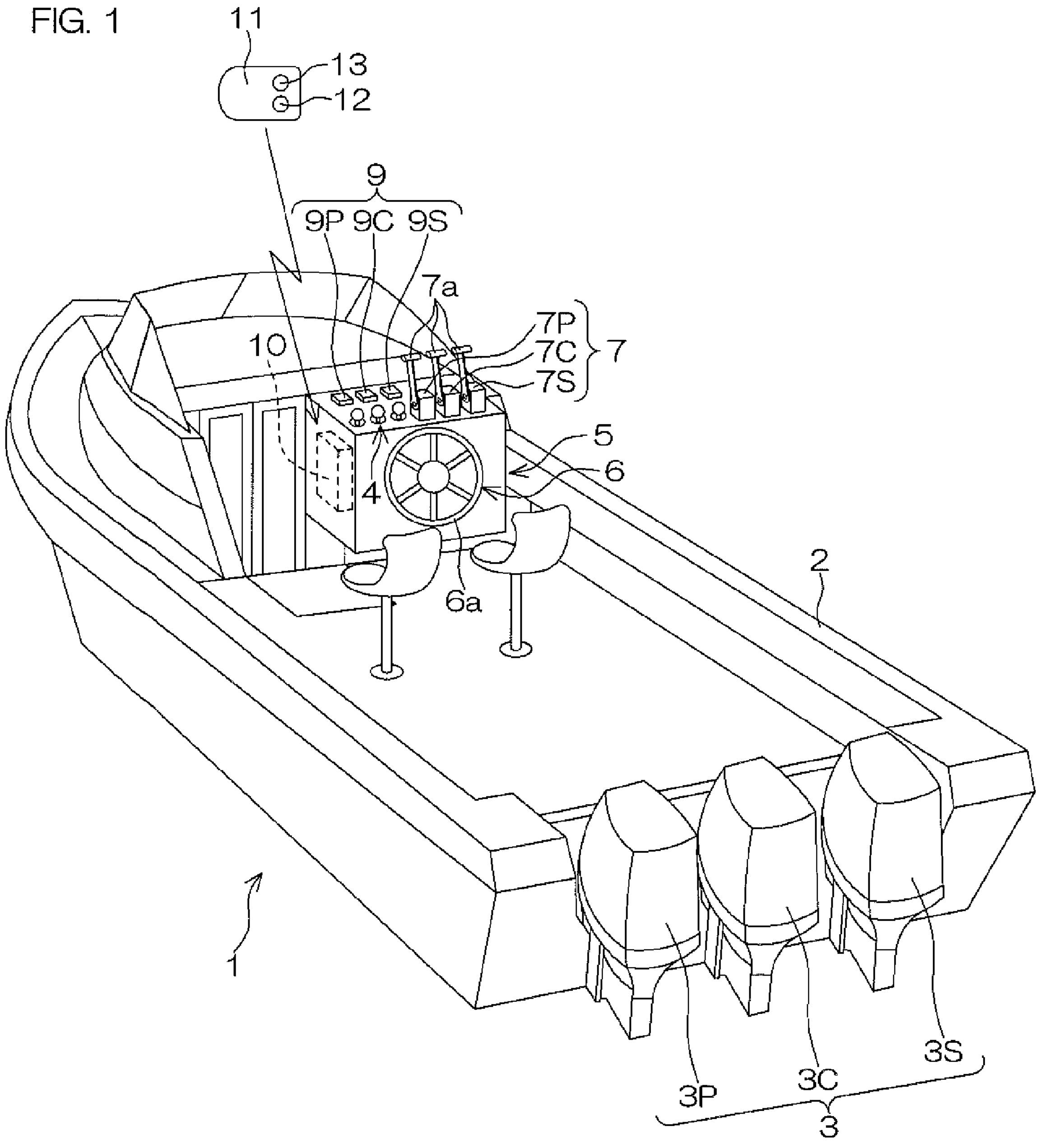
FIG. 1 is a perspective view for explaining a configuration of a marine vessel according to a preferred embodiment of the present invention.

FIG. 1 is a perspective view for explaining a configuration of a marine vessel according to a preferred embodiment of the present invention. The marine vessel 1 includes a hull 2, and outboard motors 3 as propulsion devices. A plurality of the outboard motors 3 (for example, three motors in the present preferred embodiment) are preferably provided. These outboard motors 3 are attached in parallel to a stern of the hull 2. When each of the three outboard motors is to be distinguished, that disposed at a starboard side shall be referred to as the "starboard side outboard motor 3S," that disposed at a center shall be referred to as the "central outboard motor 3C" and that disposed at a portside shall be referred to as the "portside outboard motor 3P." Each of the outboard motors 3 includes an engine and generates a propulsive force by means of a screw that is rotated by a driving force of the engine.

A marine vessel maneuvering compartment 5 is disposed at a front portion of the hull 2. The marine vessel maneuvering compartment 5 includes a steering apparatus 6, remote controllers 7, key switches 4, and gauges 9.

The steering apparatus 6 includes a steering wheel 6*a* that is rotatingly operated by an operator. The operation of the steering wheel 6*a* is mechanically transmitted by a cable (not shown) to a steering mechanism (not shown) disposed at the stern. The steering mechanism changes the directions of the three outboard motors 3 in a coupled manner. The directions of the propulsive forces are thereby changed and a heading direction of the marine vessel 1 can be changed accordingly.

Three remote controllers 7 are provided in correspondence to the three outboard motors 3. When these are to be distinguished, that corresponding to the starboard side outboard motor 3S shall be referred to as the "starboard side remote controller 7S," that corresponding to the central outboard motor 3C shall be referred to as the "central remote controller 7C," and that corresponding to the portside outboard motor 3P shall be referred to as the "portside remote controller 7P." Each of the remote controllers 7 has a lever **7*a* capable of inclination in forward and reverse directions, and operation of the lever 7*a* is transmitted to the corresponding outboard motor 3 via a cable (not shown). By inclining the lever 7*a* forward from a predetermined neutral position, a shift position of the outboard motor 3 is set at a forward drive position and a propulsive force in the forward drive direction is generated from the outboard motor 3. By inclining the lever 7*a* in the reverse direction from the neutral position, the shift position of the outboard motor 3 is set at a reverse drive position and a propulsive force in the reverse drive direction is generated from the outboard motor 3. When the lever 7*a* is at the neutral position, the shift position of the outboard motor 3 is set at the neutral position and the outboard motor 3 does not generate a propulsive force. Further, the output of the outboard motor 3, that is, the engine speed provided in the outboard motor 3 can be varied according to the inclination amount of the lever 7*a***.

The key switches 4 are for turning on and off the power supplies of the three outboard motors 3 individually and for starting and stopping the engines of the three outboard motors 3 individually.

Three gauges 9 are provided in correspondence to the three outboard motors 3. When these are to be distinguished, that corresponding to the starboard side outboard motor 3S shall be referred to as the "starboard side gauge 9S," that corresponding to the central outboard motor 3C shall be referred to as the "central gauge 9C," and that corresponding to the portside outboard motor 3P shall be referred to as the "portside gauge 9P." These gauges 9 display statuses of the corresponding outboard motors 3. More specifically, the gauges 9 display the power on/off state, the engine speed, and other necessary information on the corresponding outboard motor 3.

The marine vessel maneuvering compartment 5 further includes an immobilizer 10 (receiver). The immobilizer 10 receives signals from a key unit 11 to be carried by a user of the marine vessel 1 and is a device that allows ordinary use of the marine vessel 1 only to a legitimate user. The key unit 11 includes a lock button 12 and an unlock button 13. The lock button 12 is a button that is operated to set the immobilizer 10 in a locked state. By operation of the lock button 12, a lock signal is sent from the key unit 11. When the immobilizer 10 is set in the locked state, the marine vessel 1 is put in a state in which ordinary use is prohibited. The unlock button 13 is a button that is operated to release the locked state and set the immobilizer 10 in an unlocked state to start ordinary use of the marine vessel 1. By operation of the unlock button 13, an unlock signal is sent from the key unit 11. The key unit 11 sends a user authentication code along with the lock signal and the unlock signal.

The immobilizer 10 receives the user authentication code from the key unit 11 and executes a user authentication process. That is, the immobilizer 10 checks matching or non-matching with collation source data that are registered in advance. If the user authentication process succeeds, the immobilizer 10 accepts the lock signal and the unlock signal from the key unit 11. If the user authentication process fails, the immobilizer 10 becomes unresponsive to the lock signal and the unlock signal from the key unit 11.

Figure 2:
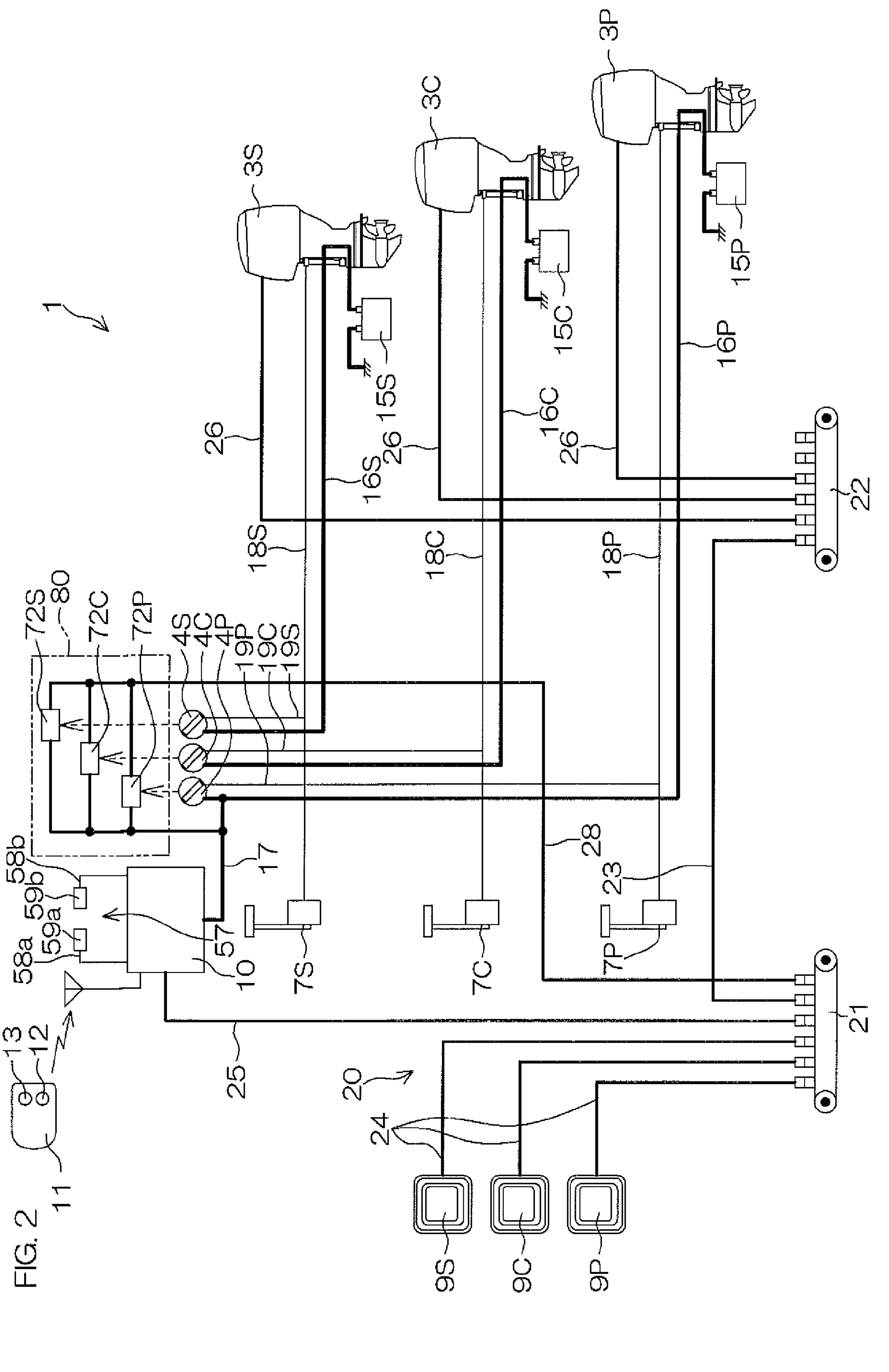
FIG. 2 is a diagram for explaining an electrical configuration of the marine vessel.

FIG. 2 is a diagram for explaining an electrical configuration of the marine vessel 1. The key switches 4 include the three key switches 4S, 4C, and 4P. That is, the key switch 4S corresponds to the starboard side outboard motor 3S, the key switch 4C corresponds to the central outboard motor 3C, and the key switch 4P corresponds to the portside outboard motor 3P. The key switches 4 include, for example, key cylinders into which keys carried by the user can be inserted. When a genuine key is inserted into a key cylinder, rotational operation of the key is enabled. The key can then be rotated from an off position (power-off position) to an on position (power-on position) to turn on the power supply of the corresponding outboard motor 3. Further, by rotating the key beyond the on position to a start position, cranking of the engine of the corresponding outboard motor 3 can be performed. By individually operating the three key switches 4S, 4C, and 4P, the turning on and off of power and the starting of the engine can be performed individually for each of the outboard motors 3. While the engine is operating, by rotatingly operating the key switches 4 to the off positions and turning off the power supplies to the outboard motors 3, the engines of the three outboard motors 3 can be stopped individually.

Three batteries 15 are respectively disposed in correspondence to the three outboard motors 3. That is, a battery 15S corresponding to the starboard side outboard motor 3S, a battery 15C corresponding to the central outboard motor 3C, and a battery 15P corresponding to the portside outboard motor 3P are provided. These batteries 15S, 15C, and 15P are respectively connected via power supply cables 16S, 16C, and 16P to the outboard motors 3S, 3C, and 3P. The batteries 15 are not necessarily disposed close to the outboard motors 3 and are disposed at suitable locations of the hull 2 in accordance with a design of a boat builder.

The power supply cables 16S, 16C, and 16P are respectively drawn from the outboard motors 3S, 3C, and 3P to the key switches 4S, 4C, and 4P. That is, the key switches 4S, 4C, and 4P are respectively interposed in the power supply cables 16S, 16C, and 16P. Further, a power supply line 17 is branched from a power supply cable 16 (for example, the power supply cable 16P) from a battery 15 (for example, the battery 15P) corresponding to a single, specific outboard motor 3 (for example, the portside outboard motor 3P). The power supply line 17 is connected to the immobilizer 10. The immobilizer 10 thus always receives the supply of power from the battery 15.

Control signal lines 18S, 18C, and 18P are respectively connected to the outboard motors 3S, 3C, and 3P. The remote controllers 7S, 7C, and 7P are respectively connected to the control signal lines 18S, 18C, and 18P. The remote controllers 7S, 7C, and 7P generate remote controller authentication codes and send the codes to the control signal lines 18S, 18C, and 18P. An outboard motor 3 is put in an operation disabled state unless a remote controller authentication code that has been registered in advance is received. Further, starting signal lines 19S, 19C, and 19P from the key switches 4S, 4C, and 4P are respectively connected to the control signal lines 18S, 18C, and 18P. When starting commands are delivered to the starting signal lines 19S, 19C, and 19P, the starters of the corresponding outboard motors 3 are actuated in response and the engines are started.

Meanwhile, an inboard LAN (local area network) 20 is constructed inside the hull 2. Specifically, the outboard motors 3, the immobilizer 10, and the gauges 9 are connected to the inboard LAN 20 and enabled to send and receive data and control signals. Further, a stem side hub 21 is disposed close to the marine vessel maneuvering compartment 5, a stern side hub 22 is disposed at the stern side, and these are connected to each other via a LAN cable 23. To the stem side hub 21, the gauges 9 are connected via LAN cables 24 and the immobilizer 10 is connected via a LAN cable 25. The outboard motors 3 are connected via LAN cables 26 to the stern side hub 22. A system power supply for the inboard LAN 20 is supplied to the stern side hub 21 from a system power supply circuit 80 via a system power supply line 28.

The system power supply circuit 80 includes three switching circuits 72S, 72C, and 72P that are respectively coupled to the key switches 4S, 4C, and 4P. The switching circuits 72S, 72C, and 72P are connected in parallel between the system power supply line 28 and the power supply cable 16P corresponding to the starboard side outboard motor 3P. The switching circuits 72S, 72C, and 72P include, for example, relays that are respectively put into conducting states when the key switches 4S, 4C, and 4P are in the on states. Supply of power to the system power supply line 28 is thus continued as long as at least one of the key switches 4S, 4C, and 4P is in the on state.

The LAN cables 23 to 26 are configured by binding power supply lines and signal lines. The LAN cables 23 to 26 are thus capable of sending power from the system power supply line 28 via the power supply lines and transmitting communication signals among the respective equipments via the signal lines. In particular, the supply of power to the gauges 9 is achieved via the system power supply line 28, the stem side hub 21, and the LAN cables 24.

Figure 3:
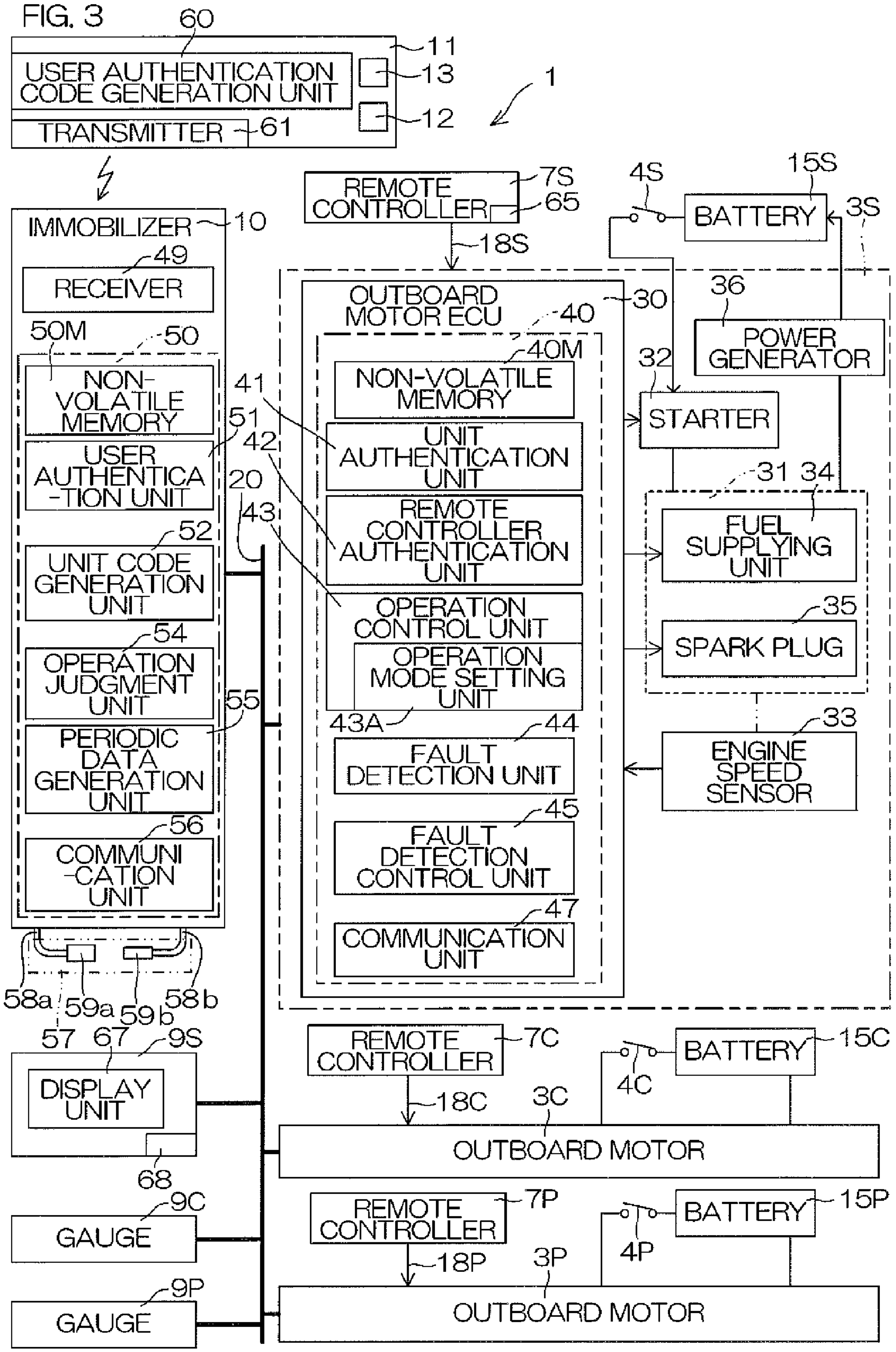
FIG. 3 is a block diagram for explaining the electrical configuration of the marine vessel in further detail.

FIG. 3 is a block diagram for explaining the electrical configuration of the marine vessel 1 in further detail. Each of the outboard motors 3 includes an outboard motor ECU (electronic control unit) 30, an engine 31, a starter 32, an engine speed sensor 33, and a power generator 36. The engine 31 includes a fuel supplying unit 34 and a spark plug 35. The fuel supplying unit 34 includes, for example, an injector that injects fuel into an air intake path of the engine 31. The spark plug 35 discharges inside a combustion chamber of the engine 31 and ignites a mixed gas inside the combustion chamber. Operations of the fuel supplying unit 34 and the spark plug 35 are controlled by the outboard motor ECU 30. The starter 32 is a device that rotates upon receiving power from the battery 15 and is for performing cranking of the engine 31 by the rotational force. The engine speed sensor 33 detects the rotational speed of the engine 31 or more specifically, the rotational speed of a crankshaft. The power generator 36 has a rotor that is rotated by the driving force of the engine 31 and generates power by rotation of the rotor. The corresponding battery 15 is charged by the power generated by the power generator 36.

The outboard motor ECU 30 includes a computer 40 (microcomputer) and drive circuits (not shown) that drive the fuel supplying unit 34, the spark plug 35, etc., and is connected to the inboard LAN 20. The computer 40 includes a CPU, a ROM, a RAM and other necessary memories, and interfaces. In particular, the computer 40 includes a non-volatile memory 40M (for example, a rewritable memory such as an EEPROM) for storing authentication source data for the immobilizer 10, authentication source data for the remote controller 7, etc., as shall be described later.

By the CPU executing predetermined operation programs stored in the ROM, the computer 40 functions as a plurality of functional processing units. The functional processing units include a unit authentication unit 41, a remote controller authentication unit 42, an operation control unit 43, a fault detection unit 44, a fault detection control unit 45, and a communication unit 47.

A function of the computer 40 as the unit authentication unit 41 is authentication of a unit authentication code sent by the immobilizer 10. More specifically, the computer 40 requests the immobilizer 10 to send the unit authentication code. In response, the immobilizer 10 sends the unit authentication code via the inboard LAN 20. The unit authentication code is received by the computer 40. The computer 40 collates the received unit authentication code with authentication source data (the legitimate unit authentication code) registered in advance in the non-volatile memory 40M and generates the collation result (success or failure).

A function of the computer 40 as the remote controller authentication unit 42 is authentication of a remote controller authentication code sent by the corresponding remote controller 7. More specifically, the computer 40 receives the remote controller authentication code from the corresponding remote controller 7 via the control signal line 18. Further, the computer 40 collates the received remote controller authentication code with authentication source data (the legitimate remote controller authentication code) registered in advance in the non-volatile memory 40M and generates the collation result (success or failure).

Functions of the computer 40 as the operation control unit 43 include allowing of operation (allowing of starting) and prohibition of operation (prohibition of starting) of the corresponding outboard motor 3. Specifically, the computer 40 receives data indicating whether the immobilizer 10 is in the locked state or in the unlocked state from the immobilizer 10 via the inboard LAN 20. When the immobilizer 10 is in the unlocked state and the unit authentication result and the remote controller authentication result are both "successful," the computer 40 allows the operation of the corresponding outboard motor 3.

Functions of the computer 40 as the operation control unit 43 further include a function as an operation mode setting unit 43A that sets an operation mode of the outboard motors 3. The operation modes of the outboard motors 3 include an ordinary operation mode and an emergency operation mode. The ordinary operation mode is an operation mode that is selected in a case where the immobilizer 10 is in the unlocked state and both the unit authentication and the remote controller authentication are successful. For example, in the ordinary operation mode, the engine speed of up to a maximum speed (for example, 6000 rpm) is allowed for the engine 31. The emergency operation mode is an operation mode that is selected when a fault of the immobilizer 10 is detected. The emergency operation mode is an operation mode in which a restriction is applied in comparison to the ordinary operation mode. Specifically, the upper limit of the rotational speed of the engine 31 is restricted to a limit speed (for example, 2000 rpm) that is lower than the maximum speed.

Functions of the computer 40 as the operation control unit 43 further include actuation of the starter 32 in response to the starting command provided via the control signal line 18 from the corresponding key switch 4S, 4C, or 4P. The corresponding engine 31 is thereby started. Functions of the computer 40 as the operation control unit 43 further include control of stopping of the corresponding engine 31 as necessary. Specifically, the engine 31 is stopped by stoppage of fuel supply by the fuel supplying unit 34 and stoppage of the ignition operation by the spark plug 35.

A function of the computer 40 as the fault detection unit 44 is detection of a fault of the immobilizer 10. The immobilizer 10 sends predetermined data (periodic data) at a fixed period to the inboard LAN 20. The computer 40 monitors the periodic data, and, when the periodic data are interrupted for a predetermined time that is longer than the period, judges that a fault has occurred in the immobilizer 10. When a fault of the immobilizer 10 is thus detected, the emergency operation mode is selected. Faults of the immobilizer 10 that can be detected by the interruption of periodic data include power supply short circuit, power supply line disconnection, ground line disconnection, microcomputer fault, etc.

A function of the computer 40 as the fault detection control unit 45 is control of the fault detection operation by the fault detection unit 44. As mentioned above, the power from the battery 15P, corresponding to the portside outboard motor 3P, is supplied to the immobilizer 10 via the power supply cable 16P and the power supply line 17. However, the location of the battery 15 is selected arbitrarily by the boat builder and the power supply cable 16 is drawn inside the marine vessel 2 across a long distance and a total length of the cable may exceed 10 meters. Thus, when a remaining capacity of the battery 15P is low and the voltage thereof is low, it may not be possible to put the immobilizer 10 into normal operation due to a voltage drop in the power supply cable 16P. In particular, the voltage drop becomes significant when the starter 32 is driven to start the engine 31 of the portside outboard motor 3P because a large current flows through the power supply cable 16P. In such a case, the immobilizer 10 becomes unable to send the periodic data and there is a possibility that the computer 40 detects a fault of the immobilizer 10. The operation mode then becomes set to the emergency operation mode.

The computer 40 makes a provisional judgment of fault occurrence when the periodic data from the immobilizer 10 becomes interrupted while the engine is stopped. When the engine 31 is thereafter started and the power generator 36 reaches a state of generating power, the fault detection is performed again. If the periodic data are still not received even after the engine 31 has been started, a main judgment of fault occurrence is made. The function of the fault detection is thus controlled.

A function of the computer 40 as the communication unit 47 is communication with other equipments connected to the inboard LAN 20. Locked or unlocked state data can be acquired from the immobilizer 10, display commands can be provided to the gauges 9, etc., by this communication.

The immobilizer 10 includes a receiver 49 and a computer 50 (microcomputer). The receiver 49 receives the signal from the key unit 11 and transfers the signal to the computer 50. The computer 50 includes a CPU, a ROM, a RAM and other necessary memories. In particular, the computer 50 includes a non-volatile memory 50M (for example, a rewritable memory such as an EEPROM). The collation source data (the legitimate user identification code) for collating the user identification code generated by the key unit 11 are registered in advance in the non-volatile memory 50M.

By execution of predetermined programs stored in the ROM, the computer 50 functions as a plurality of functional processing units. The functional processing units include a user authentication unit 51, a unit code generation unit 52, an operation judgment unit 54, a periodic data generation unit 55, and a communication unit 56

A function of the computer 50 as the user authentication unit 51 is to collate the user identification code transmitted from the key unit 11 with the collation source data registered in advance in the non-volatile memory 50M. More specifically, the computer 50 acquires the user identification code received by the receiver 49. Further, the computer 50 collates the acquired user identification code and the authentication source data registered in advance in the non-volatile memory 50M and generates the collation result (success or failure).

A function of the computer 50 as the unit code generation unit 52 is to generate the unit authentication code in response to a request from any of the outboard motor ECUs 30 respectively provided in the outboard motors 3. That is, the outboard ECU 30 provides a unit authentication code request to the immobilizer 10. In response, the unit code generation unit 52 sends the unit authentication code to the inboard LAN 20. The unit authentication code is an authentication code unique to the immobilizer 10. Authentication with respect to the unit authentication code is performed in the outboard motor ECU 30 (function of the unit authentication unit 41). The unit authentication code may be handled in an encrypted form. In this case, the outboard motor ECU 30 provides the unit authentication code request that includes an encryption key (for example, a random number) to the immobilizer 10. In response, the unit code generation unit 52 sends the unit authentication code that is encrypted using the encryption key to the inboard LAN 20. In the outboard motor ECU 30, the encrypted unit authentication code is decrypted and the decrypted unit authentication code is collated with the authentication source data.

A function of the computer 50 as the operation judgment unit 54 is to judge the operation states of the respective outboard motors 3. The computer 50 acquires the engine speed information from each of the outboard motor ECUs 30 via the inboard LAN 20 and judges whether or not the engine 31 of each of the outboard motors 3 is in operation.

A function of the computer 50 as the periodic data generation unit 55 is to generate the periodic data at the fixed period. The computer 50 generates the periodic data constantly during a term in which it is supplied with power and is operating. The periodic data includes state data that indicate whether the immobilizer 10 is in the locked state or the unlocked state. The state data thus indicate the user authentication result (success or failure) with respect to an unlock operation for releasing the locked state of the immobilizer 10. The periodic data are sent at the fixed period to the inboard LAN by the function of the communication unit 56 to be described next. The periodic data are used for fault detection of the immobilizer 10 in the outboard motor ECU 30 (function of the fault detection unit 44).

A function of the computer 50 as the communication unit 56 is to send various signals to the inboard LAN 20 and acquire various signals from the inboard LAN 20. More specifically, the computer 50 sends the unit authentication code and the periodic data to the inboard LAN 20. The computer 50 acquires the rotational speed information of the engine 31 of each of the outboard motors 3 via the inboard LAN 20.

The immobilizer 10 includes a communication interruption unit 57 arranged to stop the communication function of the communication unit 56. The communication interruption unit 57 includes, for example, a pair of lead wires 58*a* and 58*b* drawn out from the immobilizer 10. Mutually joinable terminal members 59*a* and 59*b* are joined to tips of the lead wires 58*a* and 58*b*. The terminal members 59*a* and 59*b* may, for example, be plug terminals. A circuit can be formed by electrically connecting the lead wires 58*a* and 58*b* by joining the terminal members 59*a* and 59*b*. When this circuit is formed, the communication function of the communication unit 56 is disabled.

When the communication function of the communication unit 56 is disabled, the periodic data cannot be sent and each outboard motor ECU 30 thus judges that a fault has occurred in the immobilizer 10. The operation mode of each outboard motor 3 is thereby set to the emergency operation mode.

When the key unit 11 cannot be used, the user connects the lead wires 58*a* and 58*b*. The outboard motors 3 can thereby be actuated in the emergency operation mode and a minimum propulsive force necessary for returning to port can thereby be secured. A case where the key unit 11 cannot be used refers to a case where the key unit 11 is lost due to being dropped into water, a case where a battery of the key unit 11 has run out, etc.

As mentioned above, the key unit 11 includes the lock button 12 and the unlock button 13. The key unit 11 further includes a user authentication code generation unit 60 that generates the user authentication code and a transmitter 61. The transmitter 61 transmits the lock signal to the immobilizer 10 when the lock button 12 is operated and transmits the unlock signal to the immobilizer 10 when the unlock button 13 is operated. Further, in sending these signals, the transmitter 61 also transmits the user authentication code to the immobilizer 10.

Each of the remote controllers 7 includes a remote controller authentication code generation unit 65. The remote controller authentication code generated by the remote controller authentication code generation unit 65 is transmitted to the outboard motor ECU 30 of the corresponding outboard motor 3 via the control signal line 18. An authentication process using the remote controller authentication code is performed by the computer 40 of the outboard motor ECU 30 (function as the remote controller authentication unit 42).

Each of the gauges 9 includes a display unit 67, which includes a liquid crystal display panel, etc., and a gauge number setting unit 68. The gauge number setting unit 68 includes, for example, a setting switch. One of a plurality of gauge numbers can be selected and set by operation of the setting switch. Each outboard motor ECU 30 sends the operation state data to the inboard LAN 20, designating, as a destination, the gauge 9 having the gauge number corresponding to the ECU's own equipment identification number. The operation state of the corresponding outboard motor 3 is displayed on the display unit 67 in the gauge 9 that received the operation state data. The displayed operation state includes, for example, information indicating whether or not the engine 31 is in operation and the engine speed information.

Figure 4:
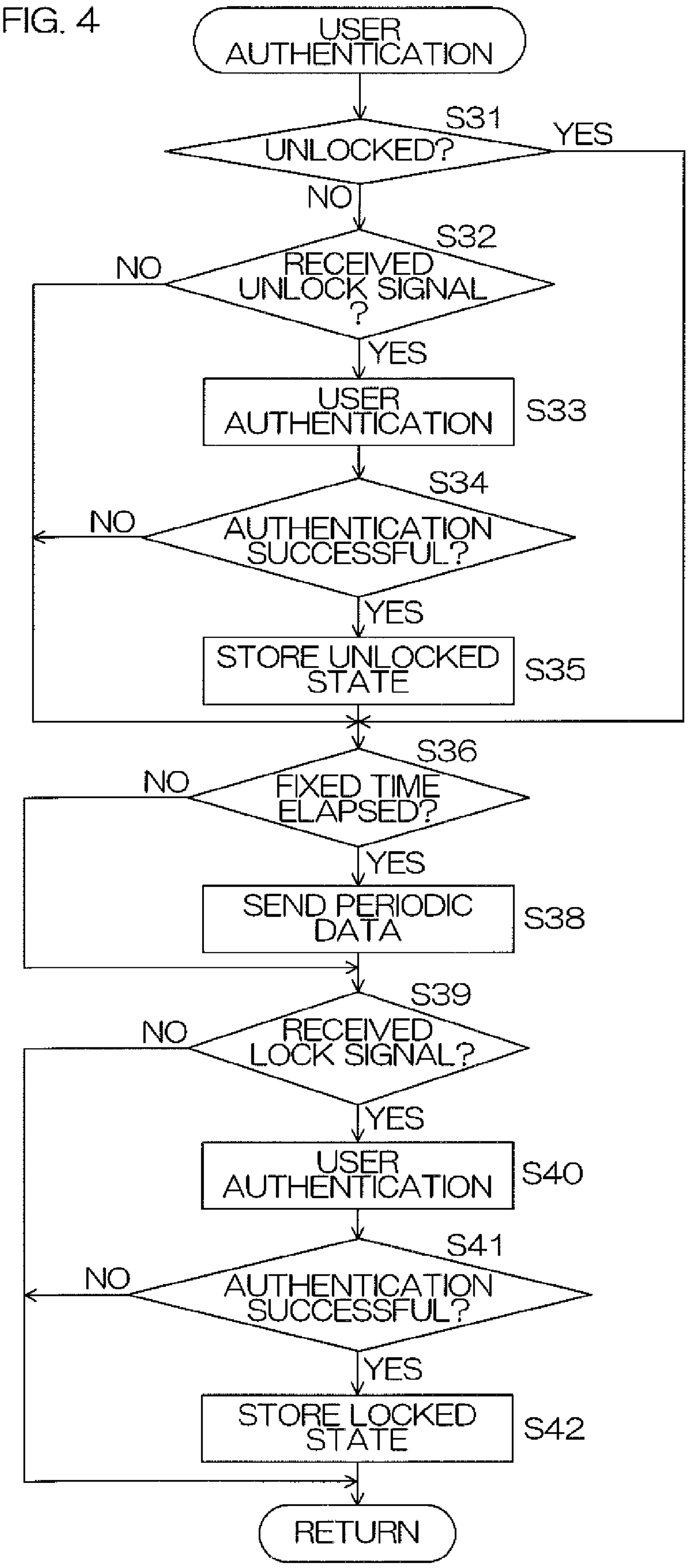
FIG. 4 is a flowchart for explaining processes executed by a computer of an immobilizer.

FIG. 4 is a flowchart for explaining processes that are repeatedly executed by the computer 50 of the immobilizer 10 at a predetermined control period (for example, 10 milliseconds). The computer 50 stores the state data indicating the unlocked state or the locked state in an internal memory. An initial value of the state data is the locked state. By referencing the state data, the computer judges whether or not the immobilizer 10 is in the unlocked state (step S31).

In the case of the locked state (step S31: NO), the computer judges whether or not the unlock signal is received (step S32). If the unlock signal is received (step S32: YES), the computer 50 executes the user authentication process (step 33). Specifically, the computer collates the user authentication code, sent along with the unlock signal from the key unit 11, with the authentication source data (the legitimate user authentication code) registered in advance in the memory 50M. If the user identification code and the authentication source data match, authentication is successful (step S34: YES), and the computer 50 rewrites the state data in the internal memory to the unlocked state (step S35).

If the unlock signal is not received (step S32: NO), the computer 50 skips the processes of steps S33 to S35. That is, the locked or unlocked state is maintained in the current state. Even if the unlock signal is received, if the authentication fails (step S34: NO), the computer 50 skips the process of step S35. That is, the locked or unlocked state is maintained in the current state. In the unlocked state (step S31), the processes of steps S32 to S35 are omitted.

The computer 50 sends the periodic data to the inboard LAN 20 at a fixed time interval (for example, a 200 millisecond interval) (steps S36 and S38). The periodic data include the state data that indicate whether the immobilizer 10 is in the unlocked state or the locked state. In the present preferred embodiment, the periodic data are preferably used in the outboard motor ECU 30 for fault detection of the immobilizer 10.

The computer 50 also judges whether or not the lock signal is received from the key unit 11 (step S39). If the lock signal is received (step S39: YES), the user authentication code, sent along with the lock signal from the key unit 11, is collated with the authentication source code registered in advance in the memory 50M (step S40). If the lock signal is not received, the computer 50 ends the processes of the current control period. That is, the locked or unlocked state is maintained in the present state.

If the user authentication process succeeds (step S41: YES), the computer 50 writes the state data, indicating the locked state, in the internal memory under certain conditions (step S42). The certain conditions include that the engine 31 is in a stopped state in all outboard motors 3. That is, if an engine 31 of any of the outboard motors 3 is in operation, the lock signal from the key unit 11 is ignored and the unlocked state is maintained. If the user authentication process fails (step S41: NO), the computer 50 ends the processes of the current control period. That is, the locked or unlocked state is maintained in the present state.

The computer 50 also generates the unit authentication code in response to a request from any of the outboard motor ECUs 30 and sends the unit authentication code to the outboard motor ECU 30 via the inboard LAN 20. When the power of the outboard motor 3 is turned on, the computer 40 of the outboard motor ECU 30 requests the immobilizer 10 to send the unit authentication code. If the immobilizer 10 is in the unlocked state, it sends an appropriate response signal that includes the unit authentication code. The unit authentication process in the outboard motor ECU 30 thus succeeds. If the immobilizer 10 is in the locked state when it receives the unit authentication code send request, it sends an illegitimate response signal. The unit authentication process thus fails. When the state of the immobilizer 10 transitions to the unlocked state thereafter and the state data in the periodic data changes to data indicating "unlocked," the computer 40 of the outboard motor ECU 30, in response, requests the sending of the unit authentication code again. This time, the immobilizer 10 sends the appropriate response signal that includes the unit authentication code. The unit authentication process in the outboard motor ECU 30 thus succeeds.

Figure 5:
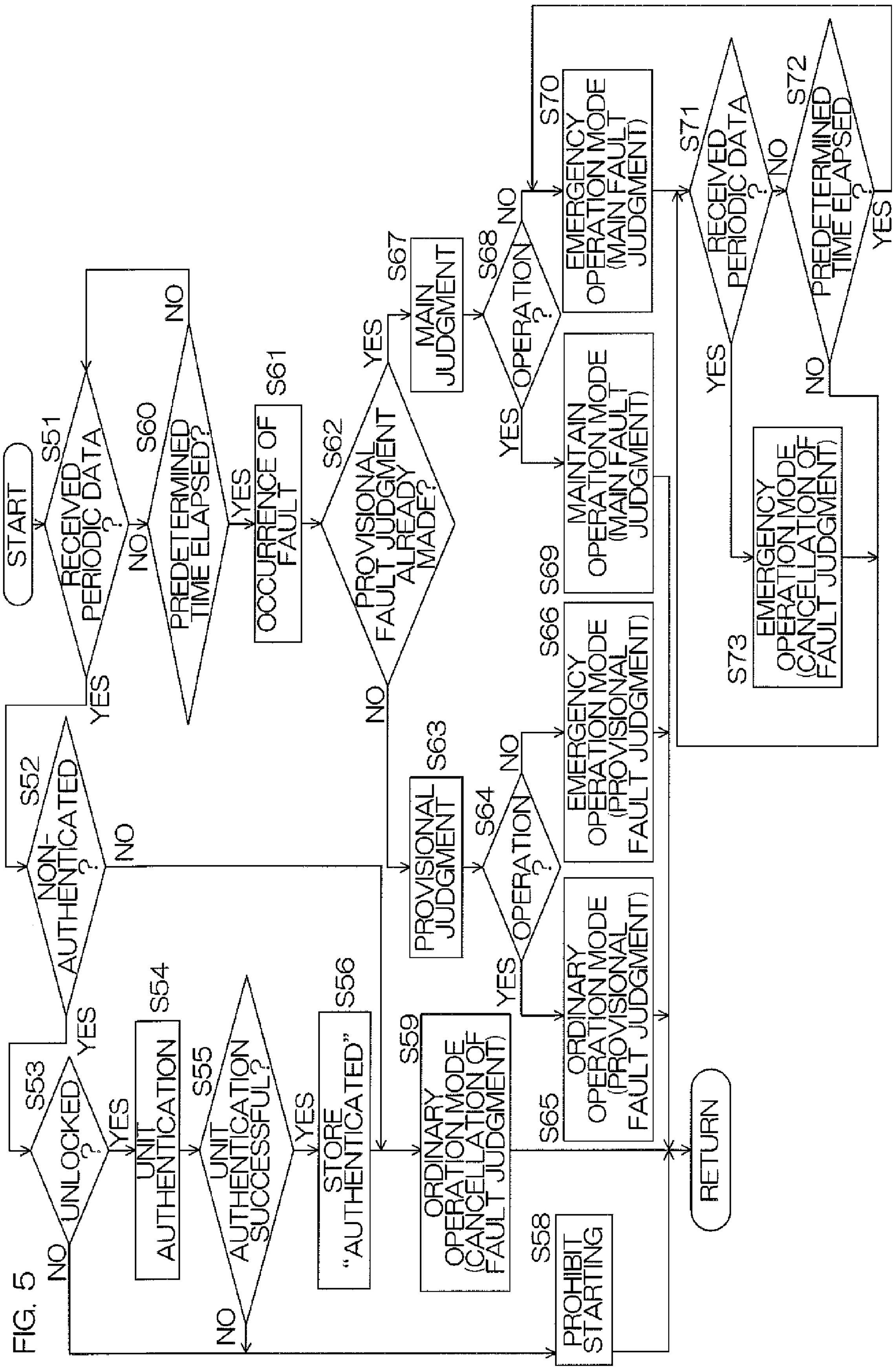
FIG. 5 is a flowchart for explaining contents of processes executed by a computer of an outboard motor ECU.

FIG. 5 is a flowchart for explaining contents of processes that are repeatedly executed by the computer 40 of an outboard motor ECU 30 at a predetermined control period (for example, 10 milliseconds). The computer 40 monitors the periodic data that are sent from the immobilizer 10 via the inboard LAN 20 (step S51). When the periodic data are received (step S51: YES), it is judged whether or not authentication state data indicating "non-authenticated" are stored in the internal memory (step S52). "Non-authenticated" indicates that the authentication process of the immobilizer 10 is incomplete. When the authentication process of the immobilizer 10 succeeds, the computer 40 rewrites the authentication state data in the internal memory to "authenticated." In the following description, the state where the value of the authentication state data stored in the internal memory of the computer 40 is "non-authenticated" shall be referred to as the "non-authenticated state," and the state where the value of the authentication state data is "authenticated" shall be referred to as the "authenticated state." An initial value of the authentication state data is "non-authenticated." That is, immediately after the power to the outboard motor ECU 30 is turned on, the value of the authentication state data is "non-authenticated."

In the non-authenticated state (step S52: YES), the computer 40 checks that the immobilizer 10 is in the unlocked state (step S53) and thereafter executes the unit authentication process (step S54; function as the unit authentication unit 41). The unit authentication process is a process of collating the unit authentication code, sent from the immobilizer 10, with the authentication source data (the legitimate unit authentication code) stored in the memory 40M. More specifically, the computer 40 requests the immobilizer 10 to send the unit authentication code. In response, the unit authentication code is sent from the immobilizer 10. This unit authentication code is collated with the authentication source data. If the unit authentication process succeeds (step S55: YES), the computer 40 rewrites the authentication state data in the internal memory to "authenticated" (step S56). Starting of the engine 31 is thereby allowed and the computer 40 sets the operation mode of the outboard motor 3 to the "ordinary operation mode" (step S59). If the unit authentication process fails (step S55: NO), the non-authenticated state is maintained and the starting of the engine 31 is prohibited (step S58).

If the immobilizer 10 is in the locked state (step S53: NO), the starting of the engine 31 is prohibited (step S58). Also, if the value of the authentication state data in the internal memory is "authenticated" (step S52: NO), the processes of steps S53 to S56 are omitted and the ordinary operation mode (step S59) is maintained.

If the periodic data are not received (step S51: NO), the computer 40 judges whether or not an elapsed time from receiving of the previous periodic data has reached a predetermined time (for example, 1 second) that is longer than the transmission period or cycle of the periodic data (step S60). If the elapsed time has not reached the predetermined time (step S60: NO), the processes from step S51 are repeated. When the elapsed time reaches the predetermined time, the computer 40 judges that a fault has occurred (step S61: function as the fault detection unit 44). The computer 40 references fault judgment data stored in the internal memory and judges whether or not the "provisional fault judgment," to be described below, has been made (step S62).

If the "provisional fault judgment" has not been made (step S62: NO), the computer 40 writes the fault judgment data indicating the "provisional fault judgment" in the internal memory (step S63). Further, the computer 40 determines whether or not the engine 31 of the corresponding outboard motor 3 is in the operating state (step S64). This determination can be made by checking whether or not the engine speed is not less than a predetermined threshold. The threshold is set to a value not less than a minimum rotational speed when the engine 31 is in a complete combustion state. If the engine 31 is in the operating state (step S64: YES), the computer 40 sets (maintains) the operation mode of the outboard motor 3 to (in) the "ordinary operation mode" (step 65; function as the operation mode setting unit 43A) and then ends the processes of the current control period. If the engine 31 is not in the operating state (step S64: NO), the computer 40 sets the operation mode of the outboard motor 3 to the "emergency operation mode" (step 66; function as the operation mode setting unit 43A) and then ends the processes of the current control period. That is, if the engine 31 of the outboard motor 3 is in operation, even if a fault is detected, the operation mode of the outboard motor 3 is held at the operation mode at that time and switching from the ordinary operation mode to the emergency operation mode is not performed.

On the other hand, if the "provisional fault judgment" has already been made (step S62: YES), the main fault judgment is made. That is, the computer 40 writes the fault judgment data indicating the "main fault judgment" in the internal memory (step S67). Further, the computer 40 determines whether or not the engine 31 of the corresponding outboard motor 3 is in the operating state (step S68). If the engine 31 is in the operating state (step S68: YES), the computer 40 maintains the operation mode of the outboard motor 3 in the operation mode at that time (step S69; function as the operation mode setting unit 43A) and then ends the processes of the current control period. That is, if the engine 31 of the outboard motor 3 is in operation, the operation mode of the outboard motor 3 is held at the operation mode at that time and switching between the ordinary operation mode and the emergency operation mode is not performed.

If the engine 31 is not in the operating state (step S68: NO), the computer 40 sets the operation mode of the corresponding outboard motor 3 to the "emergency operation mode" (step S70; function as the operation mode setting unit 43A). Further, the computer 40 monitors whether or not the periodic data are received (step S71). If a state in which the periodic data cannot be received continues for the predetermined time (step S72: YES), a return to step S70 is performed. If a state in which the periodic data are received is entered (step S71: YES), the computer 40 clears the fault judgment data to cancel the fault judgment (step S73) and continues to maintain the emergency operation mode. Thus, when the main fault judgment is made and the emergency operation mode is entered with the engine 31 being stopped, the emergency operation mode is maintained unless the power of the outboard motor 3 is turned off.

If after the power supply has been turned off once, the power supply is turned on again and the periodic data are received this time (step S51: YES), the fault judgment data are cleared when the ordinary operation mode is set (step S59). Thus, when the main fault judgment is made and the emergency operation mode is set, recovery to the ordinary operation mode cannot be performed unless the power supply is turned off once.

The "provisional fault judgment" is the fault judgment result that is obtained when a fault is detected for the first time upon interruption of the periodic data over the predetermined time. The "main fault judgment" is the judgment result that is obtained when, after the provisional fault judgment has been made, the fault is detected again by the interruption of the periodic data over the predetermined time again.

For example, when a large voltage drop occurs in the power supply cable 16P due to a large current that flows when the starter 32 is started, there is a possibility for the operation of the immobilizer 10 to be unstable temporarily. In this case, there is a possibility for the periodic data not to be sent from the immobilizer 10 temporarily. Under such circumstances, the "provisional fault judgment" (step S63) is made and the emergency operation mode is set (step S66). When the engine 31 is thereafter started completely and put in the operation state such that the supply of current to the starter 32 is stopped and the power generation by the power generator 36 is started, the voltage appearing in the power supply cable 16P stabilizes (recovers). The immobilizer 10 thus restarts the sending of the periodic data (step S51: YES) earlier than when the main fault judgment (step S67) is made. The computer 40 of the outboard motor ECU 30 then cancels the "provisional fault judgment" and sets the operation mode to the ordinary operation mode (step S59).

On the other hand, if the periodic data are not received even after the engine 31 is started completely and put in the operation state such that the supply of current to the starter 32 is stopped and the power generation by the power generator 36 is started, the main fault judgment is made (step S67). The operation mode of the outboard motor 3 is thus held in the emergency operation mode.

If the periodic data are not sent from the immobilizer 10 due to a cable disconnection fault, short circuit fault, etc., the outboard motor ECU 30 makes the provisional fault judgment (step S63) and thereafter makes the main fault judgment (step S67). If the fault is detected while the engine 31 is in operation, the provisional fault judgment and the main fault judgment are made while maintaining the ordinary operation mode (step S65 or S69).

If the fault is detected when the engine 31 is not in the operation state, the operation mode of the outboard motor 3 is set to the emergency operation mode by the provisional fault judgment or the main fault judgment being made (step S66 or S70). Thus, when the engine 31 is started thereafter, the operation mode of the outboard motor 3 is the emergency operation mode even if the fault judgment is canceled (step S73).

If the emergency operation mode is set due to the provisional fault judgment being made before the starting of the engine 31 is completed and the fault judgment is canceled after the starting of the engine 31 is completed, the operation mode of the outboard motor 3 is set to the ordinary operation mode (step S59) If the emergency operation mode is set due to the provisional fault judgment being made before the starting of the engine 31 is completed and the main fault judgment is made after the starting of the engine 31 is completed, the operation mode of the outboard motor 3 is set to the emergency operation mode (step S69).

Figure 6A:
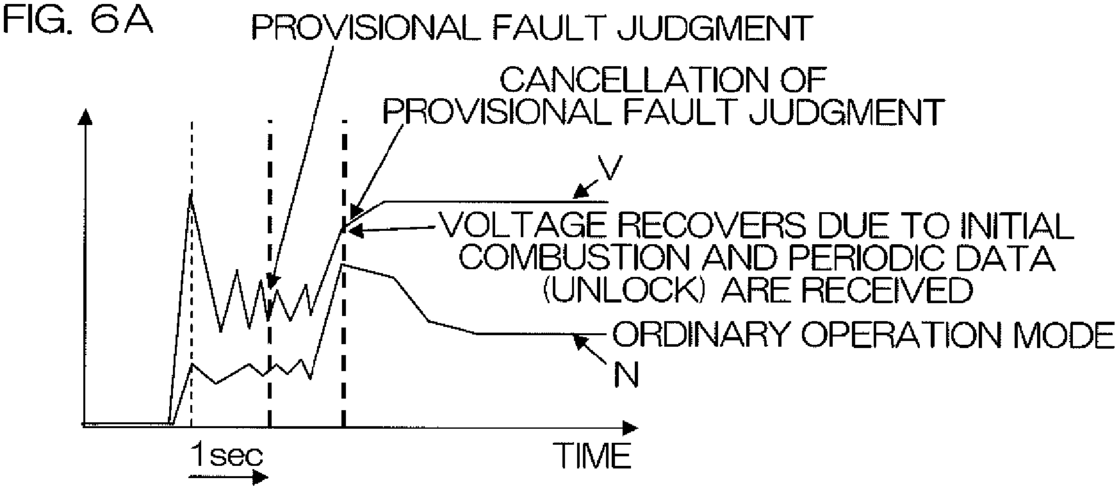
FIGS. 6A, 6B, and 6C are diagrams for explaining a fault judgment process and show examples of time variations of a power supply voltage supplied to an outboard motor and an engine speed.
Figure 6B:
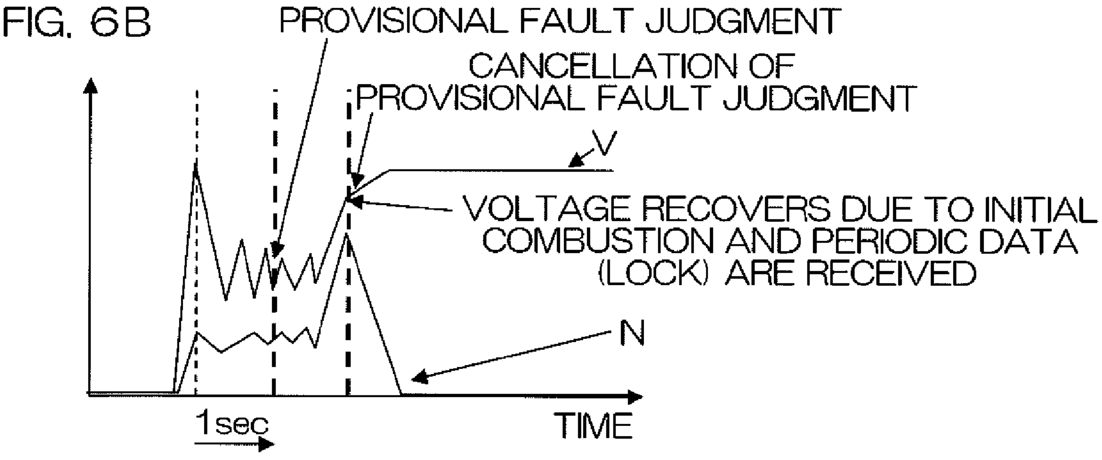
Figure 6C:
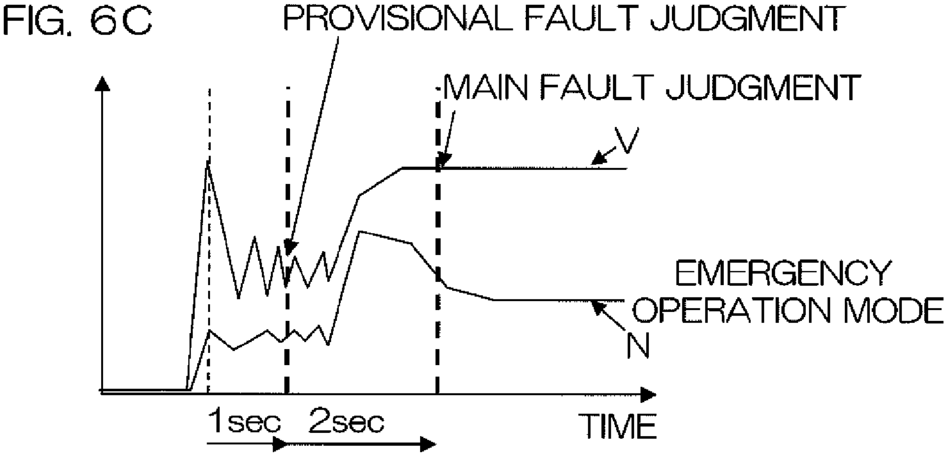

FIGS. 6A, 6B, and 6C are diagrams for explaining the fault judgment process and show examples of time variations of the power supply voltage V supplied to an outboard motor and the engine speed N. FIG. 6A shows an operation example in which the immobilizer 10 is in the unlocked state, FIG. 6B shows an operation example in which the immobilizer 10 is in the locked state, and FIG. 6C shows an operation example in which a fault is occurring. All of the examples illustrate operations in cases where the immobilizer 10 becomes unable to send the periodic data temporarily due to a voltage drop in the power supply cable 16S during cranking.

When the power of the portside outboard motor 3P is turned on by operation of the key switch 4P, the power supply voltage V rises. By the key switch 4P being operated further to the start position, the starter 32 is actuated and the cranking of the engine 31 in the portside outboard motor 3P is started. The engine speed N thus rises. Also, by a large current being supplied to the starter 32 via the power supply cable 16P, the power supply voltage V drops. If the immobilizer 10 thereby becomes unable to send the periodic data temporarily, the "provisional fault judgment" is made. The outboard motor 3 is thereby set to the emergency operation mode.

Thereafter, when the engine speed N rises due to initial combustion and the power generation by the power generator 36 starts, the power supply voltage V recovers. The immobilizer 10 is thereby put in a state in which it can send the periodic data. Consequently, the "provisional fault judgment" is cancelled and the outboard motor 3 is set to the ordinary operation mode. If the periodic data include the state data indicating the unlocked state of the immobilizer 10, operation in the ordinary operation mode is continued (see FIG. 6A).

If the periodic data include state data indicating the locked state of the immobilizer 10, operation of the engine 31 is prohibited. That is, the outboard motor ECU 30 stops the fuel supply control and the ignition control and stops the engine 31 (see FIG. 6B).

On the other hand, if the periodic data are not received even if the engine 31 is in operation, the computer 40 of the outboard motor ECU 30 makes the "main fault judgment" and maintains the emergency operation mode (see FIG. 6C).

Figure 7:
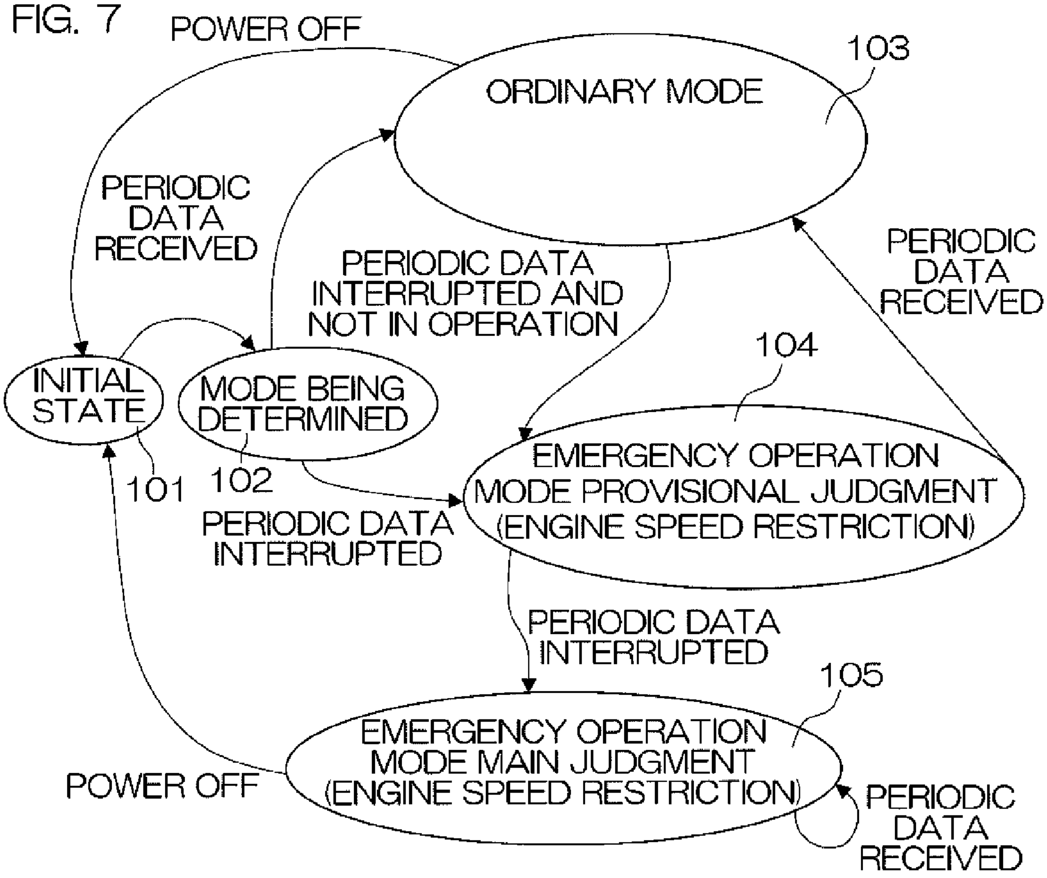
FIG. 7 is a diagram of state transitions of operation modes of the outboard motor.

FIG. 7 is a diagram of state transitions of the operation modes of the outboard motor 3. When the key switch 4 is operated and the power is turned on, the outboard motor 3 enters, via an initial state 101, a mode judging state 102 in which the periodic data from the immobilizer 10 are monitored. When the periodic data are detected, the ordinary operation mode 103 is entered. If the periodic data are not received for not less than the predetermined time in the mode judging state 102, the "provisional fault judgment" is made and an emergency operation mode provisional judgment state 104 is entered. Also, if in the ordinary operation mode 103, the periodic data are interrupted for not less than the predetermined time, transition to the emergency operation mode provisional judgment state 104 is performed if the engine 31 is not in the operating state. If the periodic data are received in the emergency operation mode provisional judgment state 104, recovery to the ordinary operation mode 103 is performed.

If in the emergency operation mode provisional judgment state 104, the periodic data cannot be received over not less than the predetermined time, the "main fault judgment" is made and transition into an emergency operation mode main judgment state 105 is performed. When the key switch 4 is operated and the power supply is turned off, a return to the initial state 101 is performed. Transition of state from the emergency operation mode main judgment state 105 to the ordinary operation mode 103 is not performed unless the power supply is turned off by the key switch 4 and the engine 31 is stopped.

Figure 8:
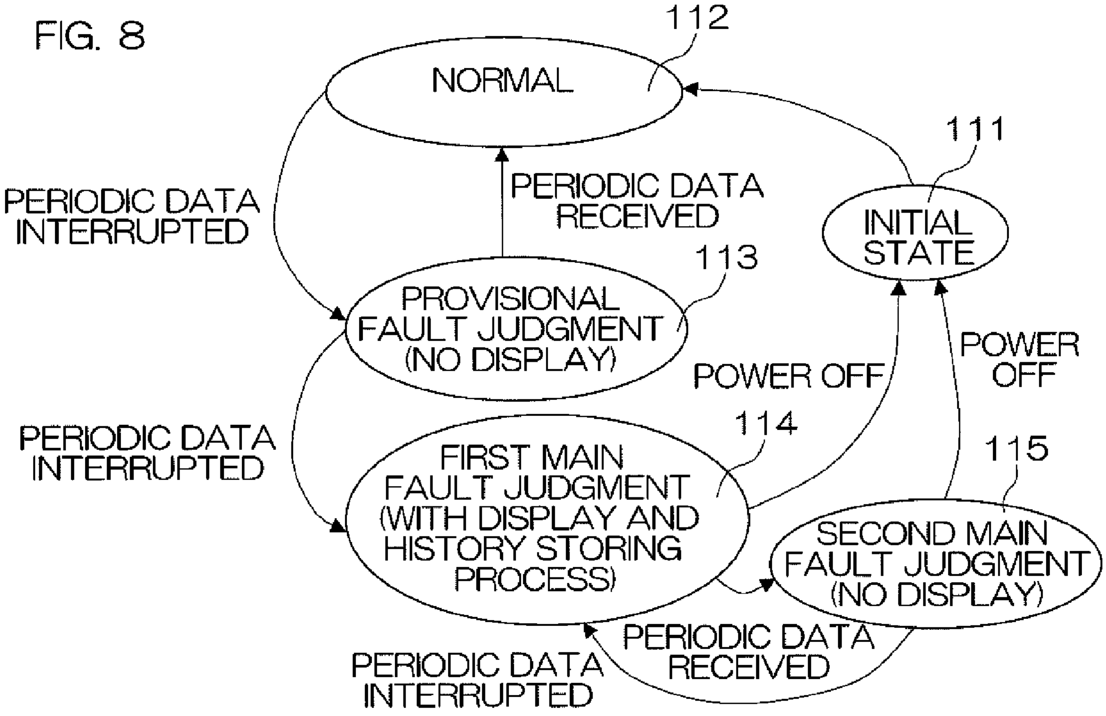
FIG. 8 is a diagram for explaining state transitions of fault judgment and mainly shows state transitions used for displaying fault states.

FIG. 8 is a diagram for explaining state transitions of fault judgment and mainly shows the state transitions used for displaying fault states. When the key switch 4 is operated and the power supply is turned on, an initial state 111 is entered and then a normal state 112 is entered. Then, by interruption of the periodic data over not less than the predetermined time, a provisional fault judgment state 113, corresponding to the emergency operation mode provisional judgment state 104, is entered. When the main fault judgment is further made in the provisional fault judgment state 113, transition into a first main fault judgment state 114 is performed. In the main fault judgment state 114, the computer 40 of the outboard motor ECU 30 displays the fault occurrence in the corresponding gauge 9. Along with this, the computer 40 writes a history of the fault in the non-volatile memory 40M.

If the receiving of the periodic data is restarted in the provisional fault judgment state 113, recovery to the normal state 112 is performed. In the provisional fault judgment state 113 and the normal state 112, fault display on the gauge 9 and writing of the fault history into the non-volatile memory 40M are not performed.

If the receiving of the periodic data is restarted in the first main fault judgment state 114, transition into a second main fault judgment state 115 is performed. In the second main fault judgment state 115, the fault display on the gauge 9 is deleted while maintaining the main fault judgment state. Also, if the periodic data are interrupted over not less than the predetermined time in the second main fault judgment state 115, a transition into the first main fault judgment state 114 is performed and the fault display on the gauge 9 is restarted. When the first main fault judgment state 114 or the second main fault judgment state 115 is entered, recovery to the normal state 112 is not performed unless the power supply is turned off once.

As described above, with the present preferred embodiment, a plurality of the outboard motors 3 are preferably associated with the single immobilizer 10. Thus, as compared to a case where each outboard motor is provided with an individual immobilizer, the configuration is simple and the locking and unlocking operation by the user are also simplified. Even if a fault occurs in the immobilizer 10, the outboard motors 3 can be operated in the emergency operation mode. Thus, even if a fault of immobilizer 10 occurs offshore, the minimum necessary propulsive force for making the marine vessel 1 return to port or shore can be secured.

Also, when the key unit 11 is lost or the key unit 11 runs out of battery while the immobilizer 10 is in the locked state, a simulated fault state can be entered by use of the communication interruption unit 57. The outboard motors 3 can thereby be operated in the emergency operation mode, and the minimum necessary propulsive force for moving the marine vessel 1 can thus be secured.

The emergency operation mode is an operation mode in which the engine output is restricted in comparison to the ordinary operation mode. There is thus no substantial economic value in the outboard motor 3 or marine vessel 1 in which only the emergency operation mode is enabled, and the theft deterrent effect by the immobilizer 10 is reliably provided.

Also, a theft deterrent system can be constructed by providing the single immobilizer 10 for a plurality of the outboard motors 3. The amount of work required to install a theft deterrent function is thus low. Working error can thus be reduced as well and consequently, a theft deterrent system of high reliability can be provided.

Further, in the present preferred embodiment, switching between the ordinary operation mode and emergency operation mode is preferably prevented while the engine 31 is in operation (except during cranking in which the provisional fault judgment may be made). The engine output thus does not change suddenly while it is in operation, and a crew member or passenger is thus not subject to an uncomfortable feeling due to the fault judgment.

Yet further, in the present preferred embodiment, when the provisional fault judgment is made before the completion of the starting of the engine, the fault detection process is performed again after the completion of the starting of the engine. Determination of the immobilizer 10 being in the fault state due to the temporary voltage drop during starting can thereby be prevented. Impediment of operation in the ordinary operation mode when a substantial problem is not occurring in the immobilizer 10 can thereby be suppressed or prevented. The reliability of fault detection can thus be improved and the operation mode of the outboard motors 3 is selected appropriately.

While a preferred embodiment of the present invention has thus been described above, the present invention may be embodied in many other ways. For example, although in the preferred embodiment described above, the mechanical remote controller 7, with which the operation of the lever **7*a* is transmitted mechanically by a cable to the outboard motor 3, is preferably used, an electric remote controller may be used instead. An electric remote controller includes a position sensor that detects the lever position and sends an output signal of the position sensor to the outboard motor ECU. The outboard motor ECU controls the shift position and the engine speed of the outboard motor in accordance with the signal from the position sensor. In such a case, an ECU may be included in the remote controller (remote controller ECU), and the unit authentication process for authentication of the unit authentication code sent by the immobilizer 10 may be performed by the remote controller ECU. The outboard motor ECU thus makes the outboard motor 3 operate if the following conditions are satisfied: the success of unlocking by the user authentication by the immobilizer 10**, the success of the unit authentication by the remote controller ECU, and the success of the remote controller authentication by the outboard motor ECU.

Also, in the preferred embodiment described above, the communication interruption unit 57 preferably enables forcible interruption of the sending of the periodic data by direct connection of the pair lead wires **58*a* and 58*b* which are drawn out from the immobilizer 10 by the terminal members 59*a* and 59*b*. However, the same function can be realized by other configurations. For example, a switch that turns off the supply of power to the immobilizer 10** may be provided.

Also, although in the preferred embodiment described above, the outboard motor is taken up as an example of the propulsion device, the present invention can be applied to marine vessel propulsion system using propulsion devices of other forms. Other examples of the propulsion device include an inboard/outboard motor (a stern drive or an inboard motor/outboard drive), an inboard motor, and a water jet drive. The outboard motor includes a propulsion unit provided outboard of the vessel and having a motor and a propulsive force generating member (propeller), and a steering mechanism, which horizontally turns the entire propulsion unit with respect to the hull. The inboard/outboard motor includes a motor provided inboard of the vessel, and a drive unit provided outboard and having a propulsive force generating member and a steering mechanism. The inboard motor includes a motor and a drive unit incorporated in the hull, and a propeller shaft extending outboard from the drive unit. In this case, a steering mechanism is separately provided. The water jet drive has a configuration such that water sucked from the bottom of the marine vessel is accelerated by a pump and ejected from an ejection nozzle provided at the stern of the marine vessel to obtain a propulsive force. In this case, the steering mechanism includes the ejection nozzle and a mechanism for turning the ejection nozzle in a horizontal plane.

A non-limiting example of correspondence between claim elements and the components used in the above description of the preferred embodiments is shown below:

starter: starter 32 power generator: power generator 36 engine: engine 31 propulsion device: outboard motor 3 battery: battery 15 authentication unit: immobilizer 10 fault detection unit: fault detection unit 44, steps S51, S63, and S64 fault detection control unit: fault detection control unit 45, steps S51, S63, S64, S66, and S67 operation control unit: operation control unit 43, steps S56 to S61 and S66 to S69 signal transmission unit: periodic data generation unit 55, communication unit 56, steps S36 and S38

While the present invention has been described in detail by way of the preferred embodiments thereof, it should be understood that these preferred embodiments are merely illustrative of the technical principles of the present invention but not limitative of the present invention. The spirit and scope of the present invention are to be limited only by the appended claims.

This application corresponds to Japanese Patent Application No. 2008-214380 filed in the Japanese Patent Office on Aug. 22, 2008, the entire disclosure of which is incorporated herein by reference.

What is claimed is:

1. A theft deterrent apparatus for a marine vessel which includes a propulsion device having, as a drive source, an engine coupled to a starter and a power generator, the theft deterrent apparatus for marine vessel comprising:

an authentication unit arranged to operate by receiving power from a battery that is arranged to supply power to the starter and accumulate power generated by the power generator;

an operation control unit arranged to allow operation of the propulsion device if authentication by the authentication unit does succeed and prohibit operation of the propulsion device if authentication by the authentication unit does not succeed;

a fault detection unit arranged to detect a fault of the authentication unit; and a fault detection control unit arranged to make a provisional fault judgment when the fault detection unit detects the fault of the authentication unit before completion of engine starting by the starter, and then make the fault detection unit perform the fault detection again after the completion of engine starting by the starter; wherein the operation control unit is arranged to allow starting of the propulsion device if the provisional fault judgment is made by the fault detection control unit.

2. The theft deterrent apparatus for marine vessel according to claim 1, wherein the operation control unit is arranged to set an operation mode of the propulsion device to an ordinary operation mode if the authentication by the authentication unit does succeed, prohibit operation of the propulsion device if the authentication by the authentication unit is not successful, and, when the fault detection unit detects the fault of the authentication unit, set the operation mode of the propulsion device to an emergency operation mode in which a predetermined restriction is applied as compared to the ordinary operation mode.

3. The theft deterrent apparatus for marine vessel according to claim 2, wherein the emergency operation mode is a mode enabling operation of the propulsion device in a range not exceeding an upper limit output that is lower than a maximum output allowed in the ordinary operation mode.

4. The theft deterrent apparatus for marine vessel according to claim 2, wherein the fault detection control unit is arranged to make the provisional fault judgment when the fault detection unit detects the fault of the authentication unit before the completion of engine starting, make a main fault judgment when the fault detection unit detects the fault of the authentication unit after the completion of engine starting, and cancel the provisional fault judgment when the fault detection unit does not detect the fault of the authentication unit after the completion of engine starting, the operation control unit is arranged such that, if the fault detection unit does not detect the fault of the authentication unit, the operation control unit sets the operation mode of the propulsion device to the ordinary operation mode if authentication by the authentication unit does succeed and prohibits operation of the propulsion device if the authentication by the authentication unit does not succeed, and when the provisional fault judgment is made and the operation control unit allows the starting of the propulsion device, the operation control unit sets the operation mode of the propulsion device to the emergency operation mode, and if the provisional fault judgment is cancelled after the completion of starting of the propulsion device, the operation control unit controls the propulsion device in accordance with the authentication result of the authentication unit.

5. The theft deterrent apparatus for marine vessel according to claim 4, wherein the operation control unit is arranged not to change the operation mode while the engine is in operation.

6. The theft deterrent apparatus for marine vessel according to claim 5, wherein the operation control unit is arranged such that, when the operation mode is the ordinary operation mode, the operation control unit does not perform a change to the emergency operation mode and maintains the ordinary operation mode while the engine is in operation, and that, when the operation mode is set to the emergency operation mode, the operation control unit maintains the operation mode in the emergency operation mode while the engine is in operation after the main fault judgment has been made.

7. The theft deterrent apparatus for marine vessel according to claim 1, wherein the authentication unit includes a signal transmission unit that is arranged to transmit a signal at a predetermined period to the fault detection unit, and the fault detection unit is arranged to judge that a fault has occurred in the authentication unit when the signal from the signal transmission unit is interrupted for a predetermined time that is longer than the predetermined period.

8. A marine vessel comprising:

a hull;

a propulsion device installed on the hull and having, as a drive source, an engine coupled to a starter and a power generator;

an authentication unit arranged to operate by receiving power from a battery that is arranged to supply power to the starter and accumulate power generated by the power generator;

an operation control unit arranged to allow operation of the propulsion device if authentication by the authentication unit does succeed and prohibit operation of the propulsion device if authentication by the authentication unit does not succeed;

a fault detection unit arranged to detect a fault of the authentication unit; and a fault detection control unit arranged to make a provisional fault judgment when the fault detection unit detects the fault of the authentication unit before completion of engine starting by the starter, and then make the fault detection unit perform the fault detection again after the completion of engine starting by the starter; wherein the operation control unit is arranged to allow starting of the propulsion device if the provisional fault judgment is made by the fault detection control unit.

9. The marine vessel according to claim 8, wherein the operation control unit is arranged to set an operation mode of the propulsion device to an ordinary operation mode if authentication by the authentication unit does succeed, prohibit operation of the propulsion device if the authentication by the authentication unit does not succeed, and, when the fault detection unit detects the fault of the authentication unit, set the operation mode of the propulsion device to an emergency operation mode in which a predetermined restriction is applied with respect to the ordinary operation mode.

10. The marine vessel according to claim 9, wherein the emergency operation mode is a mode enabling operation of the propulsion device in a range not exceeding an upper limit output that is lower than a maximum output allowed in the ordinary operation mode.

11. The marine vessel according to claim 9, wherein the fault detection control unit is arranged to make the provisional fault judgment when the fault detection unit detects the fault of the authentication unit before the completion of engine starting, make a main fault judgment when the fault detection unit detects the fault of the authentication unit after the completion of engine starting, and cancel the provisional fault judgment when the fault detection unit does not detect the fault of the authentication unit after the completion of engine starting, the operation control unit is arranged such that, if the fault detection unit does not detect the fault of the authentication unit, the operation control unit sets the operation mode of the propulsion device to the ordinary operation mode if the authentication by the authentication unit does succeed and prohibits operation of the propulsion device if the authentication by the authentication unit does not succeed, and when the provisional fault judgment is made and the operation control unit allows the starting of the propulsion device, the operation control unit sets the operation mode of the propulsion device to the emergency operation mode, and if the provisional fault judgment is cancelled after the completion of starting of the propulsion device, the operation control unit controls the propulsion device in accordance with the authentication result of the authentication unit.

12. The marine vessel according to claim 11, wherein the operation control unit is arranged not to change the operation mode while the engine is in operation.

13. The marine vessel according to claim 12, wherein the operation control unit is arranged such that, when the operation mode is the ordinary operation mode, the operation control unit does not perform a change to the emergency operation mode and maintains the ordinary operation mode while the engine is in operation, and that, when the operation mode is set to the emergency operation mode, the operation control unit maintains the operation mode in the emergency operation mode while the engine is in operation after the main fault judgment has been made.

14. The marine vessel according to claim 8, wherein the authentication unit includes a signal transmission unit that is arranged to transmit a signal at a predetermined period to the fault detection unit, and the fault detection unit is arranged to judge that a fault has occurred in the authentication unit when the signal from the signal transmission unit is interrupted for a predetermined time that is longer than the predetermined period.

* * * * *